United States Patent [19]

Bronicki

[11] 4,363,216
[45] Dec. 14, 1982

[54] LUBRICATING SYSTEM FOR ORGANIC FLUID POWER PLANT

[76] Inventor: Lucien Bronicki, P.O. Box 68, Yavne, Israel

[21] Appl. No.: 199,841

[22] Filed: Oct. 23, 1980

[51] Int. Cl.³ .............................................. F01B 31/00
[52] U.S. Cl. ...................................... 60/657; 60/646; 184/6.22
[58] Field of Search .................. 60/646, 657; 184/6.22

[56] References Cited

U.S. PATENT DOCUMENTS

| | | | |
|---|---|---|---|
| 3,194,342 | 4/1963 | Heim | 184/1 |
| 3,393,515 | 7/1968 | Tabor et al. | 60/646 |
| 3,447,314 | 6/1969 | Majkrzak | 60/657 |
| 3,831,381 | 8/1974 | Swearingen | 60/657 |
| 3,842,593 | 10/1974 | Bronicki et al. | 60/657 |
| 4,044,561 | 8/1977 | Hohn | 60/657 |
| 4,137,997 | 2/1979 | Ando | 184/6.22 |

*Primary Examiner*—Allen M. Ostrager
*Assistant Examiner*—Stephen F. Husar
*Attorney, Agent, or Firm*—Sandler & Greenblum

[57] ABSTRACT

The condensate of a closed cycle power plant that uses an organic working fluid for lubricating the bearings of the turbine is cooled to a temperature below the condenser temperature by an auxiliary cooler before being supplied to the bearings. This subcooling of the lubricating liquid increases its viscosity to a value which causes the minimum thickness of the lubricating film in the bearings to be increased significantly. By increasing the minimum film thickness, the filtering demands on the lubricating condensate are reduced and the surface finish of the journals and bearings is less critical permitting the journals and bearing to be finished by standard precision grinding techniques. In a specific embodiment of the invention, a cannister housing the turbine/generator is provided with a sump for collecting liquid working fluid which is delivered to the bearings through a cooler. Where the prime mover is coupled to a generator through a gear box, all of which are contained in the sealed cannister, the viscosity of the condensate may be increased to such a level that the cooled working fluid is adequate to lubricate the gear box itself.

13 Claims, 1 Drawing Figure

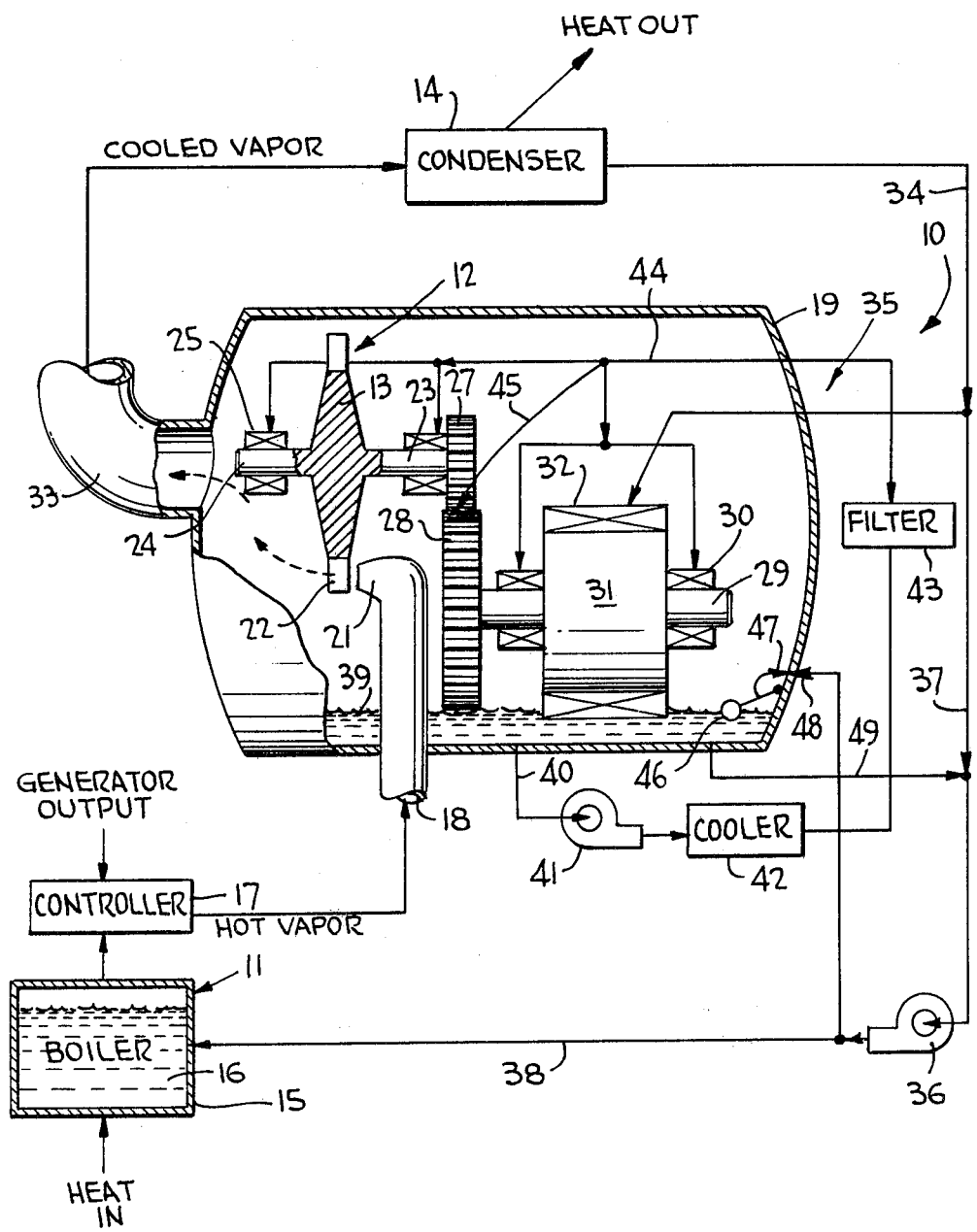

LUBRICATING SYSTEM FOR ORGANIC FLUID POWER PLANT

TECHNICAL FIELD

This invention relates to an improved lubricating system for an organic fluid power plant wherein the working fluid lubricates the bearings of the prime mover of the power plant.

BACKGROUND ART

A closed, Rankine cycle power plant is disclosed in U.S. Pat. No. 3,393,515 wherein an organic working fluid is vaporized in a boiler and supplied to a turbine which, together with a generator, is mounted on a common shaft rotatably supported hydrodynamic bearings in a hermetically sealed cannister. Vapor exhausted from the turbine is passed into a condenser which converts the exhaust vapor into condensate at a lower temperature and pressure than in the boiler. Some of the condensate in the condenser is supplied to the bearings and the remainder is returned to the boiler, either directly, if the condenser is elevated sufficiently relative to the boiler or via a pump if the elevation is insufficient. Such a power plant is hereinafter termed a power plant of the type described.

The use of hydrodynamically lubricated bearings in a power plant of the type described insures the presence of a fluid film of lubricant between the metal of the journal and the metal of the bearing. As a consequence, the only friction is that which occurs in the fluid film as it is sheared due to rotation of the journal. By utilizing techniques that insure a supply of liquid working fluid to the bearings prior to start-up of the turbine of a power plant of the type described and by utilizing a hermetically sealed cannister, the bearings will always be lubricated adequately, and their life will be indeterminately long with the result that a highly reliable power plant is established. For reasons concerned with the viscosity of the working fluid at the condenser temperature, the rotational speed of the turbine, and the bearing loading, power plants of the type described have heretofore been limited almost exclusively to relatively low levels of power, typically 1–2 KW. In this power output range, a power plant of the type described is well adapted, and is currently being utilized successfully, for powering unmanned microwave relay stations located in remote regions of the world, wherein the only maintenance over extended periods of time is replenishment of the fuel for the boiler.

The mass flow required to produce such relatively low levels of power can be handled well by a partial admission nozzle system that provides a turbine of relatively small size with a rotational speed that permits the turbine to be coupled directly to the generator. As a result, the turbine wheel and generator can be mounted on a common shaft. While the temperature of the condensate may be as high as 150° F., the viscosity of the working fluid, which may be Freon 12 or a similar organic fluid, is such that the resultant minimum lubricating film thickness formed by the condensate in the bearing is large enough under the conditions of rotational speed and bearing load for conventional metal working techniques to be utilized in fabricating the bearings and journals.

In scaling-up an organic fluid turbine by several orders of magnitude to produce a power plant in the range 150–500 KW, the diameter of the turbine must be increased significantly to provide sufficient cross-sectional area for the nozzles to acheive the required through-put of working fluid. As a consequence, rotor speed must be reduced to maintain rotor stress within allowable limits. For example, a 1–2 KW power plant will operate at around 12,000 RPM while a turbine in the 500 KW range will operate at around one-fourth of this speed. Consequently, a direct coupling between the turbine and rotor can no longer be utilized. Rather, an indirect mechanical coupling, such as a gear train, must be interposed between the turbine and the generator. This requirement creates a number of problems. First of all, in order to utilize the working fluid at the condenser temperature as a lubricant for the bearings of the turbine rotor at the bearing speeds and loadings required, the minimum lubricating film thickness achieved with condensate is so reduced that that sophisticated metal finishing techniques have to be utilized in order to produce the bearings and journals. As a consequence, large scale organic fluid turbines heretofore built require specially finished journals and bearings if condensed working fluid is to be used as a lubricant, or the use of conventional lubricants within the sealed cannister, or the use of ball bearings rather than journal bearings. Neither conventional lubricants nor ball bearings are viable solutions to this problem. Secondly, the viscosity of a typical organic working fluid at the condenser temperature is so low that liquid working fluid cannot adequately lubricate the rubbing surfaces of the mating gears. Therefore, it is conventional to place both the gear box and the generator outside the turbine cannister. This means that the turbine shaft must pass through the cannister reducing the quality of the hermetic seal of the cannister. At best, long term operation will result in the loss of working fluid at the rotary seal through which the turbine output shaft passes, and/or contamination of the working fluid from environmental factors. The advantage of this approach, however, is that conventional lubricants can be used in the gear box; and as a consequence, power plants in the range 150–500 KW have been built and operated successfully by placing the gear box and generator outside the cannister containing the turbine.

The special finishing requirements for the journals and bearings of the turbine increase the cost of manufacture and assembly, and the provision of a rotary seal on the cannister reduces the reliability of the entire system due to loss or contamination of the working fluid. It is therefore an object of the present invention to provide a new and improved lubricating system for an organic power plant which reduces or substantially overcomes the problems described above.

BRIEF DESCRIPTION OF INVENTION

Briefly, the present invention provides for increasing the viscosity of the condensate used to lubricate the bearings to a level greater than the viscosity of the condensate returned to the boiler. The viscosity of the lubricating condensate is increased by cooling such condensate to a temperature below the temperature of the condenser. By significantly decreasing the temperature of the lubricating condensate, its viscosity can be greatly increased with the result that the minimum thickness of the lubricating film in the bearings is increased significantly thereby reducing filtering demands on the lubricating condensate and permitting the journals and bearing to be finished by standard precision grinding techniques.

In a specific embodiment of the invention, the cannister is provided with a sump for collecting liquid working fluid which is delivered to the bearings through a cooler. Where the prime mover is coupled to a generator through a gear box, all of which are contained in the sealed cannister, the viscosity of the condensate may be increased to such a level that the cooled working fluid is adequate to lubricate the gear box itself.

BRIEF DESCRIPTION OF THE DRAWING

An embodiment of the invention is shown in the accompanying drawings, wherein the single FIGURE shows a power plant according to the present invention, the cannister being shown in cross-section with parts removed for the purpose of illustrating schematically, the turbine and generator interconnected by a gear box.

DETAILED DESCRIPTION OF THE INVENTION

Referring now to the drawing, reference numeral 10 designates a power plant according to the present invention comprising three main components; boiler 11, prime mover 12 in the form of turbine 13, and condenser 14 operatively connected together. Boiler 11 comprises metallic shell 15 containing liquid working fluid 16 to which heat is supplied by a burner (not shown) for the purpose of converting liquid working fluid in the boiler into vapor. Hot vapor is furnished, via controller 17, to intake pipe 18 connected to cannister 19 housing the prime mover. Intake 18, which passes through the shell of the cannister and is hermetically sealed therewith, terminates in partial admission nozzle sections 21 whose outlets are adjacent turbine blades 22 mounted on the periphery of turbine wheel 13. The turbine wheel is rigidly attached to shaft 23 carrying journals 24 at its opposite ends, the journals being housed within bearings 25 for the purpose of rotatably supporting shaft 23 within the cannister.

Under the influence of controller 17, hot vapor from the boiler is furnished to nozzle 21 which directs the vapor into engagement with blades 22 of the turbine thereby driving the turbine which in turn drives generator 26 mechanically coupled thereto through a gear train comprising pinion 27 rigidly attached to shaft 23 adjacent one of the bearings 25 and spur gear 28 rigidly attached to shaft 29 journaled in bearings 30 and rigidly connected to rotor 31 of generator 26. Stator windings 32 surround rotor 31 which may be in the form of a gage of copper bars; and the leads from the stator pass through the shell of cannister 19 and are hermetically sealed with respect thereto. These leads provide the power output of the generator whose output is monitored by controller 17 for the purpose of controlling the rate at which vapor is inputted to the turbine.

The hot vapor from the boiler expands in nozzle configuration 21; and the resultant high velocity vapor impinges on blades 22 of the turbine driving the latter and the generator. The exhaust vapor that exits from the blades pass into exhaust conduit 33 which conducts the cooled vapor to condenser 14. In a conventional manner, the condenser removes heat from the exhaust vapor which is converted into a liquid at a temperature and pressure considerably below the temperature and pressure in boiler 11. For example, for a 300 KW turbine operating with Freon 11, the boiler pressure, typically, will be about 130 psi at a temperature of about 220° F. Typically, the condenser pressure will be about 35 psi with a temperature of about 122° F.

After the exhaust vapor is condensed in condenser 14 and converted into a liquid, some of the condensate is furnished to bearing lubrication system 35 while the balance is applied to pump 36 via conduit 37 for raising the pressure of the condensate to a level greater than the pressure in boiler 11 whereby the condensate can be returned, via line 38, to the boiler thus a cycle. Lines 37 and 38 thus constitute condensate return means for returning condensate from the condenser to the boiler.

As seen in the drawing, no shrouding is provided for the turbine with the result that the contents of cannister 19 will essentially be at the condenser pressure and temperature. Thus, the entire cannister is filled with vapor at the condenser temperature and pressure; and any condensate formed in the cannister collects in sump 39 at the lower most level of the cannister. The condensate in sump 39 will be at substantially the condenser temperature and is drawn off via line 40 by pump 41 which pumps the liquid through cooler 42 where the temperature of the liquid, and as a consequence, its viscosity is substantially reduced. For example, the temperature of the working fluid may be reduced from about 112° F. entering the cooler to about 5° at the exit.

The cooled working fluid then passes through filter 43 and is delivered to piping arrangement 44 which conducts the cooled liquid to bearings 25 and 30 as well as to a dripper line 45 which furnishes cooled liquid working fluid to the meshing teeth of gear train 27, 28. Liquid drained from bearings 25 and 30, and run-off liquid from the lubrication of gear train 27, 28 are collected in sump 39 to complete the cycle for bearing lubrication system 35.

In order to maintain the liquid working fluid in sump 39 at a predetermined level, float valve 46 may be provided, this float having needle valve 47 that is operatively associated with valve seat 48 connected to one branch of the outlet of pump 36. As a consequence, float 46 rises and falls as the level in sump 39 rises and falls thereby selectively opening and closing valve 48 and maintaining the level of liquid in the sump at a predetermined value sufficient for pump 41 to supply liquid working fluid to the bearings and gear train. Liquid from the sump is normally drained through a check valve (not shown) via line 49 which is connected to the inlet of pump 36.

In a conventional power plant of the type described, the bearing lubrication system would be substantially as shown in the drawing except that cooler 42 is absent and pump 41 would return sump liquid to the boiler. The advantages gained by reason of the presence of cooler 42 can best be understood by specific examples of the minimum lubricating film thickness in the turbine bearings when a conventional lubrication system is used, and when cooler 42 is used according the present invention. Assuming a 300 KW turbine and a working fluid of Freon 11, and the temperatures and pressures in the boiler and condenser indicated previously, a typical turbine rotor will weigh approximately 220 lbs and will rotate at about 3,000 RPM. Good bearing design would necessitate a journal about 4 inches in length and about 2 inches in diameter. With a clearance of 0.0017 inches between the journal and the bearing, the Sommerfield number for this system is approximately 0.027, which indicates a heavily loaded bearing with an attitude (ratio of eccentricity of the journal in the bearing to the clearance) of 0.96. Handbook analysis for a bearing with a Sommerfield number of this magnitude and a heavily loaded bearing as indicated will provide the quantities $(r/c)f=1$, $(h_{min})/c=0.5$ and $(r/c)u(N')/F_j=0.008$, where r is the journal radius (inches), c is the clearance between journal and bearing, $(r/c)f$ is a coefficient of friction variable, $h_{min}$ is the thickness of the minimum lubricating film, u is the viscosity of the lubricating fluid in reyns, $N'$ is the journal speed in revolutions per second, and $F_j$ is the tangential frictional resistance on the journal surface due to the lubricating film.

From these values, obtained using the Sommerfield number, the mechanical losses in the bearings and the coefficient of friction can be computed. In addition, the minimum lubricating film thickness $h_{min}$ can be computed. The latter has the value 0.002 mm which is so small that excellent bearing surfaces are required and the liquid working fluid must be unusually clean in order to prevent scoring. Such a small minimum film thickness is impractical because of the surface finish constraints imposed by such thickness.

By reason of the presence of cooler 42, which lowers temperature of the lubricating fluid, its viscosity can be doubled. For example, at 112° F., the viscosity of the working fluid is approximately 0.3 cp while at 5° F., the viscosity is about 0.63 cp. As a consequence of the difference in viscosity, the Sommerfield number associated with the bearing is approximately doubled by the provision of cooler 42. Using the approach described above, the minimum film thickness of the lubricating liquid in the bearing will be approximately 0.0065 mm which is nearly a three-fold improvement in minimum film thickness by reason of supercooling the liquid working fluid. As a consequence, filtering demands are more or less standard in the sense that the minimum particle size that must be filtered is about 0.005 mm which permits conventional filter techniques to be used. More importantly, the bearing surfaces can be finished by standard precision grinding. Consequently, cooling the lubricating liquid makes the use of journal bearings practical as the main bearings for the turbine rotor.

The availability of liquid working fluid at the condenser temperature in conduit 34 permits a portion of the condensate to be diverted to stator windings 26 of the generator for the purpose of cooling the windings and reducing the amount of copper needed. Consequently, the drawing shows liquid working fluid being conducted to the stator via line 50.

The technique described above wherein the working fluid furnished to the bearings is subcooled by introducing a cooler is also applicable to relatively small sized power plants.

EXAMPLE No. 1-6 KW power plant using R 114 B2 as the working fluid

In such a power plant, the boiler temperature would be about 194° F. at a pressure of 50 psi. A typical condenser would be at 95° F. producing a back-pressure of about 10 psi. The turbine speed would be about 12000 RPM and the journal load would be about 12 lbs. At 95° F. the viscosity of R 114 B2 is about 0.65 cp while at 5° F., it is approximately doubled (1.2 cp).

Assuming a journal of 15.2 mm diameter with a length of 19.0 mm and clearance of 0.0254 mm, the Sommerfield number for the bearing is about 4.72. With an eccentricity ratio of 0.38, the minimum lubricating film thickness is about 0.0079 mm. By cooling the lubricating fluid to about 5° F., the effective bearing temperature will be approximately 35° F. This provides a Sommerfield number of about 5.3 and will result in minimum lubricating thickness of approximately 0.010 mm which is 20% greater than in the case where the working fluid is not cooled.

EXAMPLE No. 2-6 KW power plant using F-113 as the working fluid

In such a power plant, the boiler temperature would be about 194° F. at a pressure of 50 psi. A typical condenser would be at 95° F. producing a back-pressure of about 10 psi. The turbine speed would be about 12000 RPM and the journal load would be about 6 lbs. At 95° F. the viscosity of F-113 is about 0.59 cp while at 5° F., it is approximately doubled (1.28 cp).

Assuming a journal of 0.3 inches diameter with a length of 1 inch and clearance of 0.001 inches, the Sommerfield number for the bearing is about 0.11. This value, when corrected for temperature and end losses is reduced to 0.022. The minimum lubricating film thickness is about 0.0003 inches. These parameters indicate a reasonably heavily loaded bearing operation. By cooling the lubricating fluid to about 5° F., a corrected Sommerfield number of about 0.0255 is obtained. This will result in a minimum lubricating thickness greater than the thickness when the fluid is not cooled.

As a consequence of supercooling the condensate used for lubrication, machining tolerances are increased by about 40%; and at the same time, the working conditions of the bearing are improved by increasing the minimum film thickness and lowering the eccentricity. Additionally, the increase in clearance dimensions beneficially influences the whirl behaviour of the bearing.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. In a closed Rankine cycle power plant including a boiler for converting liquid working fluid into hot vapor, a prime mover responsive to the hot vapor for producing power, a condenser for receiving vapor exhausted by the prime mover and converting the vapor into condensate, means for returning condensate from the condenser to the boiler, and means to lubricate the bearings of the prime mover with condensate, the improvement comprising:

increasing the viscosity of the condensate used to lubricate the bearing to a level greater than the viscosity of the condensate returned to the boiler.

2. The improvement of claim 1 wherein the viscosity of the condensate used to lubricate the bearings is increased by cooling such condensate to a temperature below the temperature of the condenser.

3. The improvement of claim 2 wherein the prime mover is in a sealed cannister having a sump for collecting liquid working fluid which is delivered to the bearings through a cooler.

4. The improvement of claim 2 wherein the prime mover is coupled to a generator through a gear box, the primemover, generator and gear box being mounted in a sealed cannister having a sump for collecting liquid working fluid, and liquid working fluid being delivered from the sump to the bearings and the gear box through a cooler.

5. The invention of claim 4 wherein condensate from the condenser is delivered to the generator for cooling the stator windings thereof.

6. The invention of claim 4 including a level sensor in the sump, and means responsive to the threshold sensor for adding condensate to the sump when the level is below a threshhold.

7. A closed cycle power plant comprising:
   (a) boiler for converting liquid working fluid into vapor;
   (b) a cannister housing a prime mover driven by said vapor;
   (c) a condenser connected to the cannister via an exhaust conduit for condensing vapor exhausted by the prime mover;
   (d) condensate return means for returning condensate from the condenser to the boiler; and
   (e) a bearing lubrication system for supplying liquid working fluid to the bearings for lubricating the same, said bearing lubrication system including means for cooling liquid working fluid supplied to the bearings to a temperature significantly below the temperature of the condensate produced by the condenser.

8. A closed cycle power plant according to claim 7 wherein the working fluid is an organic fluid having a molecular weight greater than 40.

9. A closed cycle power plant according to claim 7 wherein the cannister contains a generator mechanically coupled to the prime mover and the bearing lubrication system supplies cooled liquid working fluid to the bearings of the prime mover.

10. A closed cycle power plant according to claim 9 wherein the mechanical coupling between the prime mover and the generator includes a gear train, and the bearing lubrication system supplies cooled liquid working fluid to the gear train for lubrication purposes.

11. A closed cycle power plant according to claim 10 wherein the stator of the generator is cooled by said condensate.

12. A closed cycle power plant according to claim 10 wherein the cannister has a sump for collecting liquid working fluid, and the bearing lubrication system includes a pump connected to the sump for pumping liquid working fluid from the sump through said means for cooling the liquid working fluid.

13. A closed cycle power plant according to claim 12 including means for furnishing condensate from the condenser to the sump in order to maintain the liquid working fluid therein at a predetermined level.

* * * * *